Patented Sept. 2, 1947

2,426,638

UNITED STATES PATENT OFFICE 2,426,638

PROCESS OF PREPARING CHF$_3$

William S. Murray, Wilmington, Del., assignor to E. I. du Pont de Nemours & Company, Wilmington, Del., a corporation of Delaware No Drawing. Application August 14, 1946,
Serial No. 690,591

20 Claims. (Cl. 260—653)

This invention relates to a process for preparing CHF$_3$ and more particularly to a continuous vapor phase process for preparing CHF$_3$ from chlorofluoromethanes containing a smaller proportion of fluorine.

The preparation of CHF$_3$ by prior known processes, such as by fluorination, have been uneconomical. In Patent 1,994,035, no CHF$_3$ was apparently obtained in the batchwise liquid phase disproportionation of CHCl$_2$F to produce CHClF$_2$. Since CHF$_3$ is of value for use in low temperature refrigeration, it has become desirable to discover a simple and economical method for making this compound in high yields.

It is an object of the present invention to provide a novel method for preparing CHF$_3$. Another object is to provide a practical and commercial method for the manufacture of CHF$_3$ in high yields. Other objects are to advance the art. Still other objects will appear hereinafter.

The above and other objects may be accomplished in accordance with my invention which comprises passing a substantially anhydrous chlorofluoromethane consisting of carbon, chlorine, fluorine and a single hydrogen, in the vapor phase through an anhydrous aluminum halide catalyst, in which the halogen is chlorine or bromine, at a rate of from 0.1 pound to 10.0 pounds of the chlorofluoromethane for each pound of aluminum halide per hour while maintaining a temperature of from about −25° C. to about +50° C. in the catalyst. I have found that, by such method, I am able to produce CHF$_3$ in excellent yields and in a simple and economical manner which is practical to employ on a commercial scale.

The chlorofluoromethanes, which may be employed in this process, are CHClF$_2$ and CHCl$_2$F. Either of these chloro fluoromethanes may be employed by itself or I may employ mixtures of the two in any desired proportions. The reactions involved may be simply illustrated by the equations:

(1) $$3\ CHClF_2 \xrightarrow{AlCl_3} CHCl_3 + 2\ CHF_3$$

(2) $$3\ CHCl_2F \xrightarrow{AlCl_3} 2\ CHCl_3 + CHF_3$$

The chlorofluoromethane should be substantially anhydrous, that is, should not contain more than about 0.001% by weight of water, so as to avoid excessive catalyst deterioration by hydrolysis and to minimize the acidity of the product gases.

The catalyst employed may be aluminum chloride or aluminum bromide. The preferred catalyst is aluminum chloride. The aluminum halide catalyst should also be substantially anhydrous. Aluminum chloride of commercial grade has been found to be very satisfactory. The aluminum halide may be employed without a carrier and, in such case, should be in the form of coarse particles, as grains, lumps, pieces, etc. Catalyst of from 2 mesh to 30 mesh is satisfactory and will usually be desired. For large commercial scale production, it will generally be preferred to have the catalyst particles in a size of from about 2 mesh to about 4 mesh. The catalyst may be diluted with a solid inert diluent, such as alumina or silica gel, if desired. Preferably, the catalyst should be diluted with a diluent which is a good conductor of heat, such as steel Raschig rings, so as to aid in the necessary temperature control, with the Raschig rings preferably constituting about 60% to about 80% by volume of the catalyst bed.

This disproportionation reaction is complicated by a side reaction which may be represented by the following equation:

$$3\ CHClF_2 + 2\ AlCl_3 \rightarrow 2\ AlF_3 + 3\ CHCl_3$$

Such reaction results in a gradual decrease in the catalyst efficiency, since the AlF$_3$ formed therein does not catalyze the desired reaction. This side reaction also results in a consumption of the starting material to produce undesired products. I have found that this side reaction takes place preferentially at elevated temperatures. On the other hand, by suitably controlling the conditions, I am able to minimize the side reaction and favor the desired reaction so as to produce high yields of CHF$_3$.

I have found that it is essential to pass the chlorofluoromethane in the vapor phase into contact with the catalyst. The catalyst should be maintained at a temperature of from about −25° C. to about +50° C. and preferably at from about −5° C. to about +15° C. and as close to 0° C. as is practical. At temperatures substantially above 50° C., the competitive side reaction takes place preferentially, resulting in rapid consumption of the catalyst and little or no yield of CHF$_3$. At temperatures below −25° C. the reaction is uneconomically slow. Optimum consumptions, yields and catalyst life are obtained at temperatures of from about −5° C. to about +15° C. In order to maintain the catalyst temperatures and the catalyst life, it will usually be desirable to precool the starting chlorofluoromethane to substantially the reaction temperature, preferably to about −5° C. to about 0° C.

The reaction is exothermic and tends to produce a localized hot spot in the catalyst which may be as high as 75° C. above the temperature of the rest of the catalyst. This requires lowering the temperature of the rest of the catalyst correspondingly in order to maintain the hot spot temperature within the desired range. In large commercial scale production, I have found it to be advantageous to dilute the chlorofluoromethane feed with about 2 to about 6 parts by weight of the crude effluent product. This procedure flattens and elongates the hot spot by decreasing the reaction rate, increasing the linear velocity of the gases and carrying off substantial amounts of heat as sensible heat in the recycled $CHF_3$ and $CHCl_3$, whereby control of the temperature in the hot spot is greatly facilitated.

The chlorofluoromethane should be fed to the catalyst at the rate of from about 0.1 pound to about 10.0 pounds for each pound of catalyst. Higher rates of feed of the chlorofluoromethane adversely affect the chlorofluoromethane consumption and the yield of $CHF_3$, render the temperature control difficult and require excessive recycling of unreacted starting material. Optimum results are obtained with a chlorofluoromethane feed rate of from about 0.5 pound to about 2.0 pounds, and particularly about 1.3 pounds, for each pound of aluminum halide per hour.

The process may be operated at pressures of from about 7 pounds to about 75 pounds per square inch absolute. As the pressure is increased, the greater concentration of the reactant gas will result in an increased reaction rate and it becomes necessary to provide for more efficient dissipation of the heat evolved so that the temperature can be maintained within the desired limits. This may be accomplished by employing known methods, such as reducing the diameter of the catalyst bed, increasing the linear velocity of the gas and the like. Usually, pressures of from about 14 to about 30 pounds per square inch absolute will be employed. Preferably, I employ pressures of about atmospheric pressure, that is, pressures of from about 14 to about 22 pounds per square inch absolute.

The reactor employed may be constructed of suitable inert material, such as glass, copper and steel. The reactor may be cooled by any suitable means, such as brine, Dry Ice with acetone and the like.

The gaseous reaction products will usually be passed through a soda lime tower or similar means for removing hydrochloric acid, and traces of moisture in the gases may be removed by passing the gases over silica or alumina gel or other suitable drying agent. The $CHF_3$ may be recovered from the $CHCl_3$, unreacted chlorofluoromethane and other products, by fractional condensation or distillation. The unreacted chlorofluoromethane and intermediate products may also be separated from the $CHCl_3$ by fractional condensation or distillation and recycled to the process.

In order to more clearly illustrate my invention, preferred modes of carrying the same into effect and the advantageous results to be obtained thereby, the following examples are given in which the per cent yield of $CHF_3$ is calculated on the basis of the starting chlorofluoromethane consumed.

Example I

Monochlorodifluoromethane (dried vapor phase over $P_2O_5$ and precooled to 0° C.) was fed in the vapor phase at 770 mm. of mercury absolute pressure into a 1½" i. d. glass reactor, containing 5 to 10 mesh $AlCl_3$, at the rate of 1.3 lbs./lb. $AlCl_3$/hour. The reaction was maintained at an average hot spot temperature of 1° C. by circulating —65° C. acetone through the reactor jacket. A $CHClF_2$ consumption of 98.5% and a $CHF_3$ yield of 97% of theory was obtained. The catalyst averaged 6.4% $AlF_3$ after this run—this corresponds to an estimated life in excess of 50 lbs. product per lb. of catalyst.

Example II

Precooled, $P_2O_5$ dried $CHClF_2$ was fed in the vapor phase at atmospheric pressure into a 2" steel reactor packed with 4 lbs. of 4–20 mesh $AlCl_3$ at the rate of 0.65 lb./lb. $AlCl_3$/hour. The catalyst temperature varied from —60° C. to +10° C. A 100% consumption of $CHClF_2$ and a 95% $CHF_3$ yield were realized.

Example III $P_2O_5$ dried $CHClF_2$ was fed in the vapor phase at atmospheric pressure at the rate of 0.14 lb./lb. $AlCl_3$/hour into a glass reactor packed with 10–20 mesh $AlCl_3$. The catalyst hot spot temperature averaged 50° C. A 100% consumption of $CHClF_2$ and a 27% yield of $CHF_3$ were obtained.

Example IV $CHClF_2$, dried liquid phase over silica gel, was passed in the vapor phase at the approximate rate of 1 lb./lb. $AlCl_3$/hour through a 2" steel, brine-cooled reactor. In order to keep the temperature within the desired range of —5° C. to +15° C., crude product (62% by weight $CHF_3$, 31% $CHClF_2$ and 7% $CHCl_3$) at the rate of 2.6 lbs./lb. $AlCl_3$/hour was mixed and fed in the vapor phase with the pure $CHClF_2$. In order to further dissipate heat, the 2–4 mesh $AlCl_3$ catalyst was diluted with 60 vol. per cent ¼" steel Raschig rings. The reaction was run at 21½ p. s. i. a. An overall $CHClF_2$ consumption of 80% and a 94% $CHF_3$ yield were obtained. A catalyst life in excess of 40 lbs. of $CHF_3$ per lb. of $AlCl_3$ was realized.

Example V

Dichloromonofluoromethane (dried vapor phase over $P_2O_5$ and precooled to 2° C.) was passed at atmospheric pressure in the vapor phase at the rate of 0.91 lb./lb. catalyst/hr. through a bed of 7–12 mesh $AlCl_3$ contained in a one-inch jacketed copper tube cooled with water at 2° C. The product contained no $CHClF_2$ and no starting material. A 50% yield of $CHF_3$ was obtained.

Example VI

A catalyst bed was prepared by mixing 70 g. of $AlBr_3$ with 150 cc. of 6–16 mesh silica gel and packing the mixture into a 1" jacketed copper tube. Monochlorodifluoromethane (dried vapor phase over $P_2O_5$ and precooled to 2° C.) was passed through this bed at atmospheric pressure in the vapor phase at the rate of 0.87 lb./lb. of $AlBr_3$/hr., while cooling with water at 2° C. 92 per cent of the $CHClF_2$ disappeared in a single pass and the yield of $CHF_3$ was quantitative.

It will be understood that the preceding examples are given for illustrative purposes solely and that my invention is not to be restricted to the specific embodiments disclosed, but that many variations and modifications can be made without departing from the spirit or scope of my invention. For example, the temperatures and rates of flow may be varied within the limits given. Mixtures of aluminum chloride and aluminum bromide may be used and the catalyst may be diluted with other inert solid materials, preferably, those having heat transfer characteristics at least equal to that of silica gel and particularly those having a heat conductivity at least equal to that of steel. In certain cases, particularly where the reaction mixture is recycled as a diluent, it may be advantageous to employ two reactors connected in series and increase the conversion of the chlorofluoromethane. In such a recycle method, a large drum type of reactor could be used for the second stage, since relatively small amounts of heat are evolved in this step. Also, other inert diluting gases, particularly those having a heat capacity equal to or higher than that of the gaseous reaction products, may be used for diluting the cholorofluoromethane. Various other methods may be employed for separating the products.

It will be seen that, by my invention, I have provided a simple and economical method of obtaining $CHF_3$ in high yields by a continuous vapor phase disproportionation of chlorofluoromethane, containing a lower concentration of fluorine, in the presence of aluminum halides. By suitable control of the conditions within the preferred range, I am able to obtain yields of $CHF_3$ of about 95% to about 98% and a catalyst life in excess of 50 pounds of $CHF_3$ per pound of aluminum halide. Thus, it will be apparent that, by my invention, I have made a very substantial advance in the art.

I claim:

1. The process of preparing $CHF_3$ which comprises passing a substantially anhydrous chlorofluoromethane, consisting of carbon, chlorine, fluorine and a single hydrogen, in the vapor phase in contact with an anhydrous aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −25° C. to about +50° C. in the catalyst hot spot, and separating $CHF_3$ from the reaction mixture.

2. The process of preparing $CHF_3$ which comprises passing a substantially anhydrous chlorofluoromethane, consisting of carbon, chlorine, fluorine and a single hydrogen, in the vapor phase in contact with an anhydrous aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −5° C. to about +15° C. in the catalyst hot spot, and separating $CHF_3$ from the reaction mixture.

3. The process of preparing $CHF_3$ which comprises passing a substantially anhydrous chlorofluoromethane, consisting of carbon, chlorine, fluorine and a single hydrogen, in the vapor phase in contact with an anhydrous aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about −5° C. to about +15° C. in the catalyst hot spot, and separating $CHF_3$ from the reaction mixture.

4. The process of preparing $CHF_3$ which comprises passing a substantially anhydrous chlorofluoromethane, consisting of carbon, chlorine, fluorine and a single hydrogen, in the vapor phase at about atmospheric pressure in contact with an anhydrous aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about −5° C. to about +15° C. in the catalyst hot spot, and separating $CHF_3$ from the reaction mixture.

5. The process of preparing $CHF_3$ which comprises passing substantially anhydrous monochlorodifluoromethane, in the vapor phase in contact with an anhydrous aluminum halide catalyst, in which the halogen is a member of the group consisting of chlorine and bromine, at a rate of from 0.1 pound to 10.0 pounds of monochlorodifluoromethane for each pound of aluminum halide per hour while maintaining a temperature of from about −25° C. to about +50° C. in the catalyst hot spot, and separating $CHF_3$ from the reaction mixture.

6. The process of preparing $CHF_3$ which comprises passing substantially anhydrous monochlorodifluoromethane, in the vapor phase in contact with an anhydrous aluminum halide catalyst, in which the halogen is a member of the group consisting of chlorine and bromine, at a rate of from about 0.5 pound to about 2.0 pounds of monochlorodifluoromethane for each pound of aluminum halide per hour while maintaining a temperature of from about −5° C. to about +15° C. in the catalyst hot spot, and separating $CHF_3$ from the reaction mixture.

7. The process of preparing $CHF_3$ which comprises passing substantially anhydrous monochlorodifluoromethane, in the vapor phase at about atmospheric pressure in contact with an anhydrous aluminum halide catalyst, in which the halogen is a member of the group consisting of chlorine and bromine, at a rate of from about 0.5 pound to about 2.0 pounds of monochlorodifluoromethane for each pound of aluminum halide per hour while maintaining a temperature of from about −5° C. to about +50° C. in the catalyst hot spot, and separating $CHF_3$ from the reaction mixture.

8. The process of preparing $CHF_3$ which comprises passing substantially anhydrous monochlorodifluoromethane, in the vapor phase in contact with anhydrous aluminum chloride, at a rate of from 0.1 pound to 10.0 pounds of monochlorodifluoromethane for each pound of aluminum chloride per hour while maintaining a temperature of from about −25° C. to about +50° C. in the catalyst hot spot, and separating $CHF_3$ from the reaction mixture.

9. The process of preparing $CHF_3$ which comprises passing substantially anhydrous monochlorodifluoromethane, in the vapor phase in contact with anhydrous aluminum chloride, at a rate of from about 0.5 pound to about 2.0 pounds of monochlorodifluoromethane for each pound of aluminum chloride per hour while maintaining a temperature of from about −5° C. to about +15° C. in the catalyst hot spot, and separating $CHF_3$ from the reaction mixture.

10. The process of preparing $CHF_3$ which comprises passing substantially anhydrous monochlorodifluoromethane, in the vapor phase at about atmospheric pressure in contact with anhydrous aluminum chloride, at a rate of from about 0.5 pound to about 2.0 pounds of monochlorodifluoromethane for each pound of aluminum chloride per hour while maintaining a temperature of from about −5° C. to about +15° C. in the catalyst hot spot, and separating CHF₃ from the reaction mixture.

11. The process of preparing CHF₃ which comprises passing substantially anhydrous dichloromonofluoromethane, in the vapor phase in contact with an anhydrous aluminum halide catalyst, in which the halogen is a member of the group consisting of chlorine and bromine, at a rate of from 0.1 pound to 10.0 pounds of dichloromonofluoromethane for each pound of aluminum halide per hour while maintaining a temperature of from about −25° C. to about +50° C. in the catalyst hot spot, and separating CHF₃ from the reaction mixture.

12. The process of preparing CHF₃ which comprises passing substantially anhydrous dichloromonofluoromethane, in the vapor phase in contact with an anhydrous aluminum halide catalyst, in which the halogen is a member of the group consisting of chlorine and bromine, at a rate of from about 0.5 pound to about 2.0 pounds of dichloromonofluoromethane for each pound of aluminum halide per hour while maintaining a temperature of from about −5° C. to about +15° C. in the catalyst hot spot, and separating CHF₃ from the reaction mixture.

13. The process of preparing CHF₃ which comprises passing substantially anhydrous dichloromonofluoromethane, in the vapor phase in contact with anhydrous aluminum chloride, at a rate of from about 0.5 pound to about 2.0 pounds of dichloromonofluoromethane for each pound of aluminum chloride per hour while maintaining a temperature of from about −5° C. to about +15° C. in the catalyst hot spot, and separating CHF₃ from the reaction mixture.

14. The process of preparing CHF₃ which comprises passing a substantially anhydrous chlorofluoromethane, consisting of carbon, chlorine, fluorine and a single hydrogen, diluted with from about 2 to about 6 parts by weight of gaseous reaction products for each part of the chlorofluoromethane, in the vapor phase in contact with an anhydrous aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −25° C. to about +50° C. in the catalyst hot spot, recycling part of the gaseous reaction products for diluting fresh chlorofluoromethane, and finally separating CHF₃ from nonrecycled reaction products.

15. The process of preparing CHF₃ which comprises passing a substantially anhydrous chlorofluoromethane, consisting of carbon, chlorine, fluorine and a single hydrogen, diluted with from about 2 to about 6 parts by weight of gaseous reaction products for each part of the chlorofluoromethane, in the vapor phase contact with an anhydrous aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about −5° C. to about +15° C. in the catalyst hot spot, recycling part of the gaseous reaction products for diluting fresh chlorofluoromethane, and finally separating CHF₃ from nonrecycled reaction products.

16. The process of preparing CHF₃ which comprises passing a substantially anhydrous chlorofluoromethane, consisting of carbon, chlorine, fluorine and a single hydrogen, in the vapor phase in contact with an anhydrous catalyst bed composed of from about 60% to about 80% by volume of an inert solid diluent and from about 40% to about 20% by volume of an aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −25° C. to about +50° C. in the hot zone of the catalyst bed, and separating CHF₃ from the reaction mixture.

17. The process of preparing CHF₃ which comprises passing a substantially anhydrous chlorofluoromethane, consisting of carbon, chlorine, fluorine and a single hydrogen, in the vapor phase in contact with an anhydrous catalyst bed composed of from about 60% to about 80% by volume of an inert solid diluent, having heat transfer characteristics at least equal to that of silica gel, and from about 40% to about 20% by volume of an aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −25° C. to about +50° C. in the hot zone of the catalyst bed, and separating CHF₃ from the reaction mixture.

18. The process of preparing CHF₃ which comprises passing a substantially anhydrous chlorofluoromethane, consisting of carbon, chlorine, fluorine and a single hydrogen, in the vapor phase in contact with an anhydrous catalyst bed composed of from about 60% to about 80% by volume of steel Raschig rings and from about 40% to about 20% by volume of an aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about −5° C. to about +15° C. in the hot zone of the catalyst bed, and separating CHF₃ from the reaction mixture.

19. The process of preparing CHF₃ which comprises passing a substantially anhydrous chlorofluoromethane, consisting of carbon, chlorine, fluorine and a single hydrogen, diluted with from about 2 to about 6 parts by weight of gaseous reaction products for each part of the chlorofluoromethane, in the vapor phase in contact with an anhydrous catalyst bed composed of from about 60% to about 80% by volume of an inert solid diluent and from about 40% to about 20% by volume of an aluminum halide catalyst, in which the halogen is a member of the group consisting of chlorine and bromine, at a rate of from 0.1 pound to 10.0 pounds of chlorofluoromethane for each pound of aluminum halide per hour while maintaining a temperature of from about −25° C. to about +50° C. in the hot zone of the catalyst bed, recycling part of the gaseous reaction products for diluting fresh chlorofluoromethane, and finally separating CHF₃ from nonrecycled reaction products.

20. The process of preparing CHF₃ which comprises passing a substantially anhydrous chlorofluoromethane, consisting of carbon, chlorine, fluorine and a single hydrogen, diluted with from about 2 to about 6 parts by weight of gaseous reaction products for each part of the chlorofluoromethane, in the vapor phase in contact with an anhydrous catalyst bed composed of from about 60% to about 80% by volume of an inert solid diluent, having heat transfer characteristics at least equal to that of silica gel, and from about 40% to about 20% by volume of an aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about $-5°$ C. to about $+15°$ C. in the hot zone of the catalyst bed, recycling part of the gaseous reaction products for diluting fresh chlorofluoromethane, and finally separating $CHF_3$ from nonrecycled reaction products.

WILLIAM S. MURRAY.

Certificate of Correction

Patent No. 2,426,638.　　　　　　　　　　　　　　　　　September 2, 1947.

WILLIAM S. MURRAY

It is hereby certified that error appears in the printed specification of the above numbered patent requiring correction as follows: Column 6, line 48, claim 7, for "$+50°$ C." read $+15°$ C.; and that the said Letters Patent should be read with this correction therein that the same may conform to the record of the case in the Patent Office.

Signed and sealed this 14th day of October, A. D. 1947.

[SEAL]

THOMAS F. MURPHY,
*Assistant Commissioner of Patents.* prises passing a substantially anhydrous chlorofluoromethane, consisting of carbon, chlorine, fluorine and a single hydrogen, diluted with from about 2 to about 6 parts by weight of gaseous reaction products for each part of the chlorofluoromethane, in the vapor phase in contact with an anhydrous catalyst bed composed of from about 60% to about 80% by volume of an inert solid diluent, having heat transfer characteristics at least equal to that of silica gel, and from about 40% to about 20% by volume of an aluminum halide catalyst, in which the halogen is a member of the group consisting of chlorine and bromine, at a rate of from about 0.5 pound to about 2.0 pounds of chlorofluoromethane for each pound of aluminum halide per hour while maintaining a temperature of from about $-5°$ C. to about $+15°$ C. in the hot zone of the catalyst bed, recycling part of the gaseous reaction products for diluting fresh chlorofluoromethane, and finally separating $CHF_3$ from nonrecycled reaction products.

WILLIAM S. MURRAY.

Certificate of Correction

Patent No. 2,426,638.

September 2, 1947.

WILLIAM S. MURRAY

It is hereby certified that error appears in the printed specification of the above numbered patent requiring correction as follows: Column 6, line 48, claim 7, for "$+50°$ C." read $+15°$ C.; and that the said Letters Patent should be read with this correction therein that the same may conform to the record of the case in the Patent Office.

Signed and sealed this 14th day of October, A. D. 1947.

[SEAL]

THOMAS F. MURPHY,
*Assistant Commissioner of Patents.*